United States Patent [19]

Baba

[11] 4,028,549
[45] June 7, 1977

[54] SYNCHRONIZED ACCUMULATING RADIODETECTOR

[76] Inventor: Shigeo Baba, 7649 Fuchu, Tokyo 183, Japan

[22] Filed: Dec. 8, 1975

[21] Appl. No.: 638,631

[30] Foreign Application Priority Data

Dec. 6, 1974 Japan ............................ 49-140719

[52] U.S. Cl. .............................. 250/336; 250/380; 250/385
[51] Int. Cl.² .......................................... G01T 1/18
[58] Field of Search ................... 250/375, 378–389, 250/336

[56] References Cited

UNITED STATES PATENTS

| 3,617,709 | 11/1971 | Tone | 250/379 |
| 3,676,679 | 7/1972 | Waters | 250/380 |
| 3,892,968 | 7/1975 | Lovelock | 250/385 |

Primary Examiner—Harold A. Dixon

[57] ABSTRACT

A synchronized accumulating radiodetector comprises a series of longitudinally connected counting tubes of equal inner volume, a plurality of switching units adapted to be synchronized with the flow speed of radioactive substance traveling with reference to the counting tubes, and a plurality of counting accumulators for counting the radioactivity and accumulate number of the radioactivity. The radiodetector has an accumulated counting output mechanism, from which output is sent to auxiliary recording or displaying unit.

1 Claim, 9 Drawing Figures

SYNCHRONIZED ACCUMULATING RADIODETECTOR

FIELD OF INVENTION

The present invention relates to a synchronized accumulating radioactive detector.

PRIOR ART

In detecting radioactivity of the radioactive substance flowing along side of a radiodetector, the detector assembly hitherto in common use has been composed of a single counting tube. This type of detector has been its inherent drawbacks and does not give an efficient counting result. The reason for this comes from the fact that the use of a single counting tube does not make it possible to offer a simultaneous increase in both the detecting efficiency for the radioactivity and the resolving power of, for example, two components separated by gas chromatography. This is illustrated in FIG. 1. That is FIG. 1A indicates that although a counting tube of a relatively small inner volume provides a high resolving power in detecting. A radioactive component X moving through the counting tube, the detecting efficiency for the radioactivity is obliged to decrease since the residing time of the component X in the counting tube becomes correspondingly shorter. Furthermore, an increase in the inner volume of the counting tube, results in a higher detecting efficiency for the radioactivity. This increase in the volume, however, causes a problem of detecting the radioactivity of another radioactive component Y together with that of component X since components X and Y reside in the counting tube at the same time as shown in FIG. 1B. Therefore the resolving power for each component becomes insufficient. These facts point out the fundamental difficulty in that one can not solve the problem of increasing both the detecting efficiency and the resolving power simultaneously when only one counting tube is used.

The present invention is characterized in the use of multiple counting tubes of an equal volume to overcome the above-mentioned drawbacks. A series of counting tubes are connected longitudinally, either directly next to each other or at a fixed distance. As the radioactive substance travels through or along side the counting tubes, the radioactivity present in a certain portion detected individually by each counting tube is accumulated in one of the accumulators by the switching device described below.

In the following is explained a typical example of a synchronized accumulating radiodetector of the present invention. In FIG. 2 is diagrammed the counting unit composed of triple tubes.

In FIG. 2A, B, and C are illustrated how two radioactive components X and Y move in the counting tubes $C_1$ through $C_3$ as indicated by arrows with elapsing of time $t=0$, $t=a$, and $t=2a$, where a is the time required for a radioactive component to travel through each counting tube. In the present invention radioactivities detected by tubes $C_3$, $C_2$, and $C_1$ during time intervals of $T_3$ ($2a-3a$), $T_2$ ($a-2a$), and $T_1$ ($0-a$), respectively are accumulated into the accumulator. The accumulated counting output is then sent to the auxiliary recording or displaying assembly. The same counting accumulation process is taken by the subsequent radioactive component coming into the counting tubes. A comparison of FIG. 1B with FIG. 2 clearly tells that the present invention makes it possible to raise the detecting efficiency for radioactivity to three times without sacrificing the resolving power for each radioactive component.

A typical triple-tube radiocounting assembly is diagrammed in FIG. 3. The counting assembly is divisible into three major units: (1) the detector assembly composed of counting tubes $C_1$, $C_2$, and $C_3$, (2) switching system composed of switching devices B1, B2, and B3 each having three contacting points ①,②, and ③ synchronized in a manner described below, and (3) counting accumulators $A_1$, $A_2$, and $A_3$ connected with B1, B2, and B3, respectively.

DETAILED DESCRIPTION OF DRAWINGS

Figure 1A:
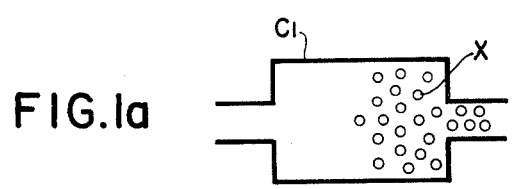
Figure 1B:
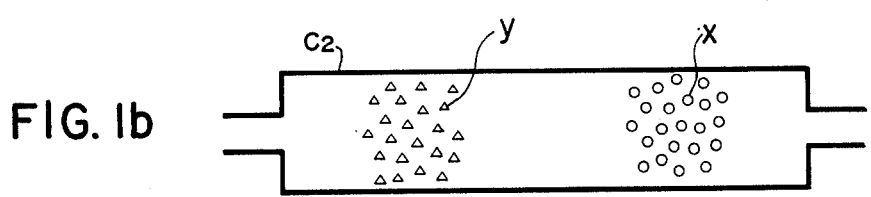

FIGS. 1a and 1b illustrates the travelling characteristics of two radioactive components X and Y in counting tubes of different inner volume, followed by gas chromatographic separation of X and Y.

Figure 2A:
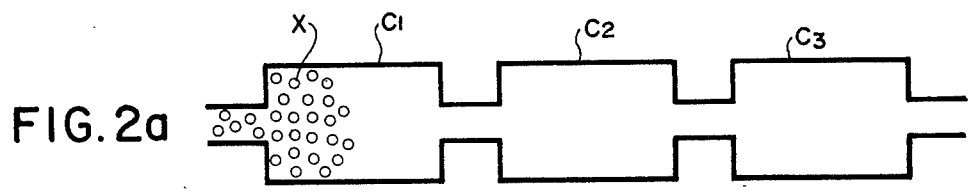
Figure 2B:
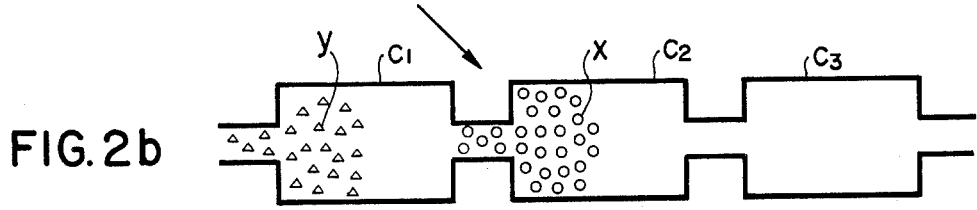
Figure 2C:
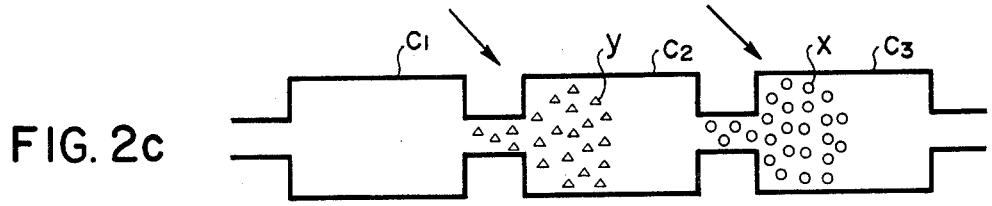

FIGS. 2a, 2b, 2c are schematic descriptions of the present invention principle in which multiple counting tubes of an equal inner volume are connected longitudinally at a certain distance and the radioactive components separated by gas chromatography move through the inner side of the counting tubes. The radioactivity present in a certain portion of the flow is detected by each counting tube during consecutive time intervals and accumulated in one of the accumulators.

Figure 3:
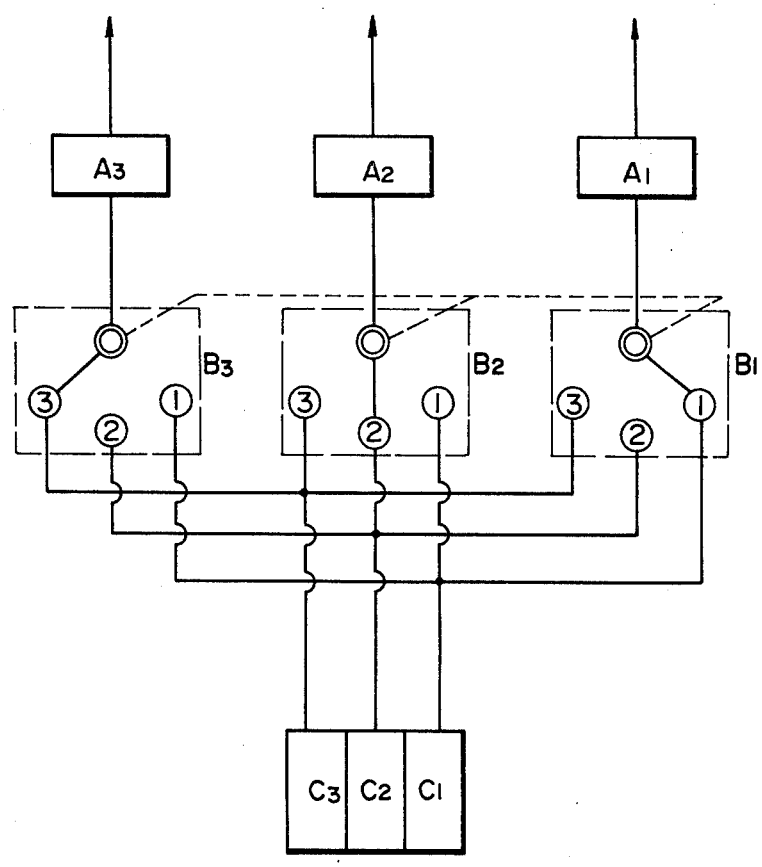

FIG. 3 is a simplified block diagram of a triple-tube counting assembly of the present invention and its operation principle is shown in FIG. 2.

FIG. 4 demonstrates practical examples of radioactivity detection following thin layer chromatographic separation of two radioactive components.

Figure 4A:
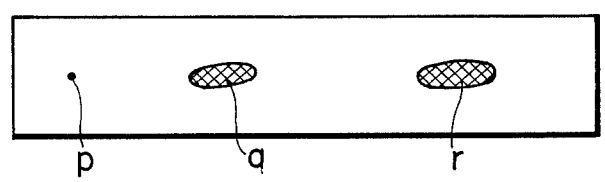

The results obtained by autoradiography, counting device comprised of a single counting tube, and a triple-tube radiodetector are shown in FIG. 4A, B, and C respectively.

DESCRIPTION OF PREFERRED EMBODIMENT

Accumulator output from each accumulator is sent to the auxiliary appropriate scaler. The synchronized off-on operation is performed electronically according to a switching signal produced by a known method in every set-time interval based on the moving speed of the radioactive substance. In FIG. 3, switching devices $B_1$, $B_2$, and $B_3$ are contacted with contacting points ①,②, and ③, respectively. When switching devices $B_1$, $B_2$, and $B_3$ are connected to $C_1$, $C_2$, and $C_3$ at time 0 ($t=0$) as shown in FIG. 3, each switching device is then continually switched to the next contacting point as the time elapses $T_1 \rightarrow T_2 \rightarrow T_3$. This synchronized switching mechanism works in such a manner as the radioactivity present in the same portion is detected by each counting tube and the counting information from each counting tube is accumulated in the same accumulator. The accumulate is reset when the switching device finishes selecting a full cycle of contacting points ①,②, and ③.

In the following is explained the connecting mechanism between the counting tube and the accumulator. During a time interval of $T_1$ accumulator $A_1$ is connected to counting tube $C_1$ through contacting point ① of switching device $B_1$. Synchronized with the moving speed of the radioactive substance, $A_1$ is then connected to $C_2$ followed by $C_3$ during $T_2$ and $T_3$ through contacting points ② and ③, respectively. In this manner the radioactivity present in the same portion of the flow is accumulated in $A_1$ from counting tubes $C_1$, $C_2$, and $C_3$. The radioactivity counting accumulate in $A_1$ is sent to the adjacent scaler at the moment when the counting information from $C_3$ is put into $A_1$, that is, $t=3a$ and then the switching device is reset. In a similar manner, accumulator $A_3$ is connected to counting tube $C_3$ through contacting point ③ of switching device $B_3$ during the $T_1$ interval and the input counting is sent to the auxiliary scaler at $t=a$, right after $A_1$ obtains the counting information from $C_3$, followed by resetting of $B_3$. In the subsequent time intervals $T_2$ and $T_3$, $A_3$ is connected to $C_1$ and $C_2$ through contacting points ① and ② of $B_3$, respectively, and $A_3$ accumulates the radioactivity counting in the second portion of the radioactive flow.

During a counting period, each switching mechanism is synchronized with the switching signal as described above and is connected to each counting tube chronically. Therefore, there should not be difference in radiodetecting efficiency or in resolving power of a radioactive component through each switching system.

The above explanation exemplifies the counting of radioactive components travelling through triple counting tubes following gas chromatographic separation of the components. The present invention, however, is also applied in such other cases as a thin layer radiochromatograph scanner and paper radiochromatograph scanner in which the radioactive substance moves along side the counting assembly. The counting procedure will be of course exactly the same as the one described above.

Figure 4B:
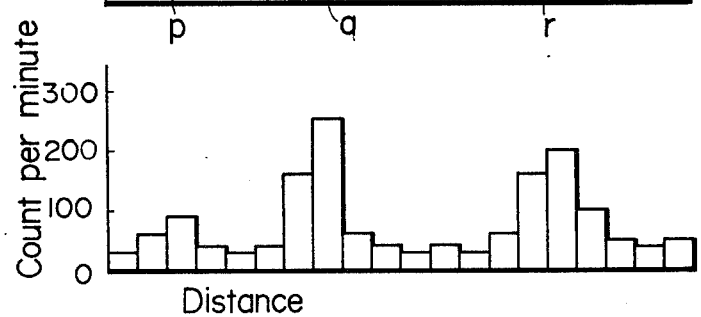
Figure 4C:
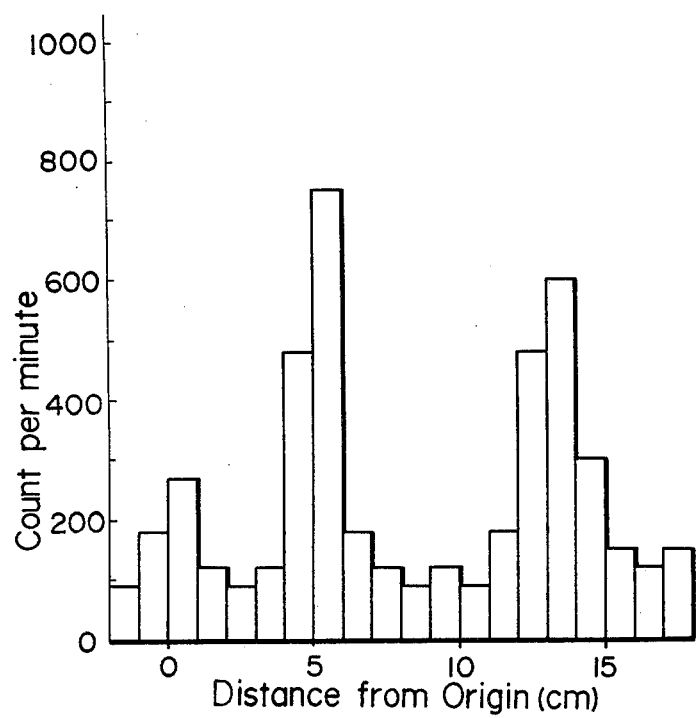

In FIG. 4A through 4C are shown the results of radioactivity detection of radioactive components on a thin layer chromatogram. FIG. 4A is a radioautogram showing two different radioactive components q and r, p indicating the origin. FIG. 4B shows the counting carried out by a detecting device hithereto in use comprised of a single counting tube. In FIG. 4C is shown the result obtained by a triple-tube counting assembly of the present invention illustrated in FIG. 3. FIG. 4C clearly demonstrates that the detecting efficiency is raised three times as much as that in FIG. 4B.

Although a specific preferred emobodiment of the present invention has been described in the detailed description above, the description is not intended to limit the invention to the particular forms or embodiments disclosed herein, since they are to be recognized as illustrative rather than restrictive. The invention is declared to cover all changes and modifications of the specific example of the invention herein disclosed for purposes of illustration, which do not constitute departures from the spirit and scope of the invention.

What is claimed is:

1. A synchronized accumulating radiodetector comprising of a series of counting tubes of equal inner volume, a switching assembly synchronizing with the flow speed of radioactive substance traveling through or along side of said counting tubes, counting accumulators for the detected radioactivity and an associated output system, wherein said counting tubes are longitudinally connected to each other at a fixed distance and said switching assembly is composed of a series of switching devices each provided at the corresponding counting tube.

* * * * *